US010444295B2

(12) United States Patent
Wen et al.

(10) Patent No.: US 10,444,295 B2
(45) Date of Patent: Oct. 15, 2019

(54) BATTERY BALANCE MANAGEMENT CIRCUIT

(71) Applicant: NATIONAL CHUNG SHAN INSTITUTE OF SCIENCE AND TECHNOLOGY, Taoyuan (TW)

(72) Inventors: Shu-Hsien Wen, Taoyuan (TW); Kuo-Kuang Jen, Taoyuan (TW); Gwo-Huei You, Taoyuan (TW); Chung-Ling Tseng, Taoyuan (TW)

(73) Assignee: NATIONAL CHUNG SHAN INSTITUTE OF SCIENCE AND TECHNOLOGY, Taoyuan (TW)

( * ) Notice: Subject to any disclaimer, the term of this patent is extended or adjusted under 35 U.S.C. 154(b) by 27 days.

(21) Appl. No.: 15/848,177

(22) Filed: Dec. 20, 2017

(65) Prior Publication Data
US 2019/0187213 A1 Jun. 20, 2019

(51) Int. Cl.
H02J 7/00 (2006.01)
G01R 31/387 (2019.01)
H01M 10/42 (2006.01)
H01M 10/44 (2006.01)

(52) U.S. Cl.
CPC ...... G01R 31/387 (2019.01); H01M 10/4285 (2013.01); H01M 10/441 (2013.01); H02J 7/0006 (2013.01); H02J 7/0019 (2013.01); H02J 7/0021 (2013.01); G06F 2217/78 (2013.01); H02J 7/0026 (2013.01); H02J 2007/005 (2013.01)

(58) Field of Classification Search
CPC .............. G01R 31/387; H01M 10/441; H01M 10/4285; H02J 7/0026; H02J 7/0019; H02J 7/0006

USPC .......................................................... 320/134
See application file for complete search history.

(56) References Cited

U.S. PATENT DOCUMENTS

| 3,959,712 A * | 5/1976 | Kelley, Jr. | H02M 5/271 363/148 |
| 5,438,250 A * | 8/1995 | Retzlaff | H02J 7/0019 320/128 |
| 5,656,915 A * | 8/1997 | Eaves | H01M 10/482 320/118 |
| 5,760,488 A * | 6/1998 | Sonntag | B60L 3/0069 307/10.1 |
| 5,811,959 A * | 9/1998 | Kejha | H02J 7/0018 320/126 |
| 5,869,950 A * | 2/1999 | Hoffman, Jr. | B60K 6/28 320/103 |
| 5,952,815 A * | 9/1999 | Rouillard | H02J 7/0021 320/116 |
| 6,538,414 B1 * | 3/2003 | Tsuruga | H02J 7/0016 320/119 |

(Continued)

FOREIGN PATENT DOCUMENTS

TW    I527341 B    3/2016

Primary Examiner — Robert Grant
Assistant Examiner — John T Trischler
(74) Attorney, Agent, or Firm — WPAT, PC

(57) ABSTRACT

A battery balance management circuit includes an active and passive testing balance bus, a plurality of battery sets, a primary charging converter, a secondary charging system, an electrical load and a battery management system. An external balance management mechanism is utilized to compensate for current loss of the battery set, effectively enabling the battery sets to provide stable large current output.

7 Claims, 2 Drawing Sheets

(56) References Cited

U.S. PATENT DOCUMENTS

| | | | |
|---|---|---|---|
| 6,867,604 B2* | 3/2005 | Haldeman | G01R 19/16542, 320/137 |
| 6,984,961 B2* | 1/2006 | Kadouchi | H02J 7/0019, 320/132 |
| 7,081,737 B2* | 7/2006 | Liu | H01M 10/441, 320/130 |
| 7,091,700 B2* | 8/2006 | Kadouchi | H02J 7/0019, 320/132 |
| 7,474,078 B2* | 1/2009 | Baker | H01M 8/04223, 320/134 |
| 7,489,106 B1* | 2/2009 | Tikhonov | H02J 7/0018, 320/116 |
| 7,553,583 B2* | 6/2009 | Eaves | H01M 10/425, 429/61 |
| 7,564,217 B2* | 7/2009 | Tanigawa | H02J 7/0016, 320/118 |
| 7,571,683 B2* | 8/2009 | Kumar | B60L 9/16, 105/35 |
| 7,683,576 B2* | 3/2010 | Tien | H02J 7/0019, 320/128 |
| 7,696,725 B2* | 4/2010 | Liu | H01M 10/441, 320/136 |
| 7,745,025 B2* | 6/2010 | Leach | H02J 7/0018, 320/101 |
| 7,786,699 B2* | 8/2010 | Demers | H02J 7/0014, 320/116 |
| 7,812,572 B2* | 10/2010 | Bolz | H02J 7/0018, 320/116 |
| 7,854,203 B2* | 12/2010 | Kumar | B60L 9/16, 105/35 |
| 8,004,246 B2* | 8/2011 | Liu | H01M 10/441, 320/136 |
| 8,093,862 B2* | 1/2012 | Mariels | H02J 7/0016, 320/116 |
| 8,183,833 B2* | 5/2012 | Kobayashi | H02J 7/0014, 320/117 |
| 8,237,411 B2* | 8/2012 | Liu | H01M 10/441, 320/136 |
| 8,493,028 B2* | 7/2013 | Sutardja | H02J 7/0014, 320/116 |
| 8,723,481 B2* | 5/2014 | Zhang | H01M 10/441, 320/116 |
| 8,736,231 B2* | 5/2014 | Sutardja | H02J 7/0014, 320/117 |
| 8,773,070 B2* | 7/2014 | Kang | H02J 7/0016, 320/118 |
| 8,816,639 B2* | 8/2014 | Lu | H02J 7/0016, 320/116 |
| 8,836,165 B2* | 9/2014 | Wei | H02M 1/10, 307/77 |
| 8,836,290 B2* | 9/2014 | Liu | H01M 10/441, 320/136 |
| 8,928,283 B2* | 1/2015 | Nakao | H01M 10/441, 320/119 |
| 8,970,162 B2* | 3/2015 | Kim | H02J 7/0019, 320/103 |
| 9,018,908 B2* | 4/2015 | Yen | H02J 7/0016, 320/125 |
| 9,048,669 B2* | 6/2015 | Lim | H02J 7/0019 |
| 9,048,670 B2* | 6/2015 | Kim | H02J 7/0019 |
| 9,048,722 B2* | 6/2015 | Sun | H02M 7/003 |
| 9,083,189 B2* | 7/2015 | Wang | H02J 7/0018 |
| 9,088,164 B2* | 7/2015 | Shim | H02J 7/0019 |
| 9,124,085 B2* | 9/2015 | Wu | H02H 1/00 |
| 9,153,843 B2* | 10/2015 | Liang | H01M 10/443 |
| 9,153,974 B2* | 10/2015 | Reynolds | H02J 7/0016 |
| 9,233,612 B2* | 1/2016 | Kumar | B60L 9/16 |
| 9,318,779 B2* | 4/2016 | Uno | H01M 10/44 |
| 9,350,156 B2* | 5/2016 | Kanzaki | H02H 7/1257 |
| 9,356,469 B2* | 5/2016 | Kuroda | H02J 7/0031 |
| 9,362,757 B2* | 6/2016 | Deal | H02J 7/0019 |
| 9,379,557 B2* | 6/2016 | Song | H02J 7/0014 |
| 9,385,553 B2* | 7/2016 | Aiura | H01M 10/425 |
| 9,450,274 B2* | 9/2016 | Vo | H01M 10/4257 |
| 9,450,516 B2* | 9/2016 | Chiang | H02M 7/493 |
| 9,455,578 B2* | 9/2016 | Kim | H02J 7/00 |
| 9,472,961 B2* | 10/2016 | De Cock | H02J 7/0019 |
| 9,478,977 B2* | 10/2016 | Li | H02H 9/02 |
| 9,490,645 B2* | 11/2016 | Shi | H02J 7/0054 |
| 9,525,289 B2* | 12/2016 | Yoshida | H01M 10/425 |
| 9,531,037 B2* | 12/2016 | Ogg | H01M 10/4207 |
| 9,559,528 B2* | 1/2017 | Kim | H02J 7/0016 |
| 9,564,768 B2* | 2/2017 | Hatanaka | H02J 7/0063 |
| 9,620,969 B2* | 4/2017 | Kobayashi | H02J 7/0016 |
| 9,651,627 B2* | 5/2017 | Le Neel | H02J 7/0021 |
| 9,716,392 B2* | 7/2017 | Lian | B60L 58/10 |
| 9,731,616 B2* | 8/2017 | Hatanaka | B61C 3/02 |
| 9,755,442 B2* | 9/2017 | Kageyama | H02J 7/0029 |
| 9,787,106 B2* | 10/2017 | Maleki | H02J 7/008 |
| 9,847,658 B2* | 12/2017 | Kuhlmann | H02J 7/0026 |
| 9,893,539 B2* | 2/2018 | Nakamura | H02J 7/0016 |
| 9,948,115 B2* | 4/2018 | Ivanov | H02J 7/0014 |
| 10,003,106 B2* | 6/2018 | Jeon | H02J 7/0065 |
| 10,050,437 B2* | 8/2018 | Nomoto | H01M 10/441 |
| 10,063,070 B2* | 8/2018 | Hsiao | H02J 7/0019 |
| 10,074,997 B2* | 9/2018 | Vo | H01M 10/4257 |
| 10,211,629 B2* | 2/2019 | Li | H02H 9/02 |
| 10,224,581 B2* | 3/2019 | Ogg | H01M 10/4207 |
| 2002/0060914 A1* | 5/2002 | Porter | E02D 7/26, 363/21.01 |
| 2003/0146737 A1* | 8/2003 | Kadouchi | H02J 7/0019, 320/132 |
| 2003/0152830 A1* | 8/2003 | Eaves | H01M 10/425, 429/156 |
| 2004/0257042 A1* | 12/2004 | Liu | H01M 10/441, 320/130 |
| 2005/0235865 A1* | 10/2005 | Kumar | B60L 9/16, 105/61 |
| 2005/0266303 A1* | 12/2005 | Kadouchi | H02J 7/0019, 429/92 |
| 2006/0103351 A1* | 5/2006 | Tanigawa | H02J 7/0016, 320/118 |
| 2006/0164038 A1* | 7/2006 | Demers | H02J 7/0014, 320/116 |
| 2006/0255769 A1* | 11/2006 | Liu | H01M 10/441, 320/134 |
| 2007/0188138 A1* | 8/2007 | Kobayashi | H02J 7/0014, 320/119 |
| 2008/0272736 A1* | 11/2008 | Tien | H02J 7/0019, 320/126 |
| 2009/0314179 A1* | 12/2009 | Kumar | B60L 9/16, 105/35 |
| 2010/0001737 A1* | 1/2010 | Kubo | H02J 7/0013, 324/434 |
| 2010/0052614 A1* | 3/2010 | Mariels | H02J 7/0016, 320/116 |
| 2010/0134069 A1* | 6/2010 | Oosawa | H02J 7/0021, 320/118 |
| 2010/0188046 A1* | 7/2010 | Liu | H01M 10/441, 320/118 |
| 2010/0188047 A1* | 7/2010 | Liu | H01M 10/441, 320/118 |
| 2010/0253286 A1* | 10/2010 | Sutardja | H02J 7/0014, 320/118 |
| 2011/0041723 A1* | 2/2011 | Kumar | B60L 9/16, 105/35 |
| 2011/0089898 A1* | 4/2011 | Lee | H02J 7/0016, 320/116 |
| 2011/0298425 A1* | 12/2011 | Liu | H01M 10/441, 320/118 |
| 2011/0316483 A1* | 12/2011 | Zhang | H01M 10/441, 320/118 |
| 2012/0007433 A1* | 1/2012 | Wei | H02M 1/10, 307/82 |
| 2012/0056475 A1* | 3/2012 | Wei | B60L 50/15, 307/9.1 |
| 2012/0056584 A1* | 3/2012 | Mariels | H02J 7/0016, 320/109 |

(56) References Cited

U.S. PATENT DOCUMENTS

| | | | |
|---|---|---|---|
| 2012/0056585 A1* | 3/2012 | Mariels | H02J 7/0016 320/116 |
| 2012/0062038 A1* | 3/2012 | Wang | H02J 7/0018 307/82 |
| 2012/0086390 A1* | 4/2012 | Lim | H02J 7/0019 320/107 |
| 2012/0104856 A1* | 5/2012 | Gottlieb | H02J 1/10 307/66 |
| 2013/0015820 A1* | 1/2013 | Kim | H02J 7/0019 320/128 |
| 2013/0015821 A1* | 1/2013 | Kim | H02J 7/0019 320/128 |
| 2013/0049762 A1* | 2/2013 | Ogg | H01M 10/4207 324/433 |
| 2013/0057224 A1* | 3/2013 | Choi | H02J 7/0016 320/136 |
| 2013/0093395 A1* | 4/2013 | Liu | H02J 7/0019 320/118 |
| 2013/0134784 A1* | 5/2013 | Dung | H02J 7/0019 307/43 |
| 2013/0158912 A1* | 6/2013 | Yen | G01R 31/382 702/63 |
| 2013/0187605 A1* | 7/2013 | Potts | B60L 58/14 320/112 |
| 2013/0187612 A1* | 7/2013 | Aiura | H01M 10/425 320/118 |
| 2013/0207613 A1* | 8/2013 | Loncarevic | H02J 7/0016 320/134 |
| 2013/0214739 A1* | 8/2013 | Lee | H02J 7/0016 320/118 |
| 2013/0278218 A1* | 10/2013 | Onnerud | H01M 10/441 320/118 |
| 2013/0300344 A1* | 11/2013 | Sutardja | H02J 7/0014 320/103 |
| 2013/0335026 A1* | 12/2013 | Reynolds | H02J 7/0016 320/112 |
| 2014/0002005 A1* | 1/2014 | Sutardja | H02J 7/0016 320/103 |
| 2014/0042974 A1* | 2/2014 | Yang | H01M 10/441 320/119 |
| 2014/0145678 A1* | 5/2014 | Hwang | H02J 3/32 320/118 |
| 2014/0184161 A1* | 7/2014 | Deal | H02J 7/0019 320/121 |
| 2014/0239901 A1* | 8/2014 | De Cock | H02J 7/0019 320/119 |
| 2014/0306662 A1* | 10/2014 | Kim | H02J 7/0016 320/118 |
| 2014/0306666 A1* | 10/2014 | Choi | H02J 7/0016 320/134 |
| 2014/0312828 A1* | 10/2014 | Vo | H01M 10/4257 320/103 |
| 2014/0312850 A1* | 10/2014 | Song | H02J 7/0014 320/134 |
| 2014/0340044 A1* | 11/2014 | Kim | H02J 7/0016 320/134 |
| 2015/0035495 A1* | 2/2015 | Yoshida | H01M 10/425 320/134 |
| 2015/0061601 A1* | 3/2015 | Hatanaka | H01M 10/44 320/136 |
| 2015/0061686 A1* | 3/2015 | Liao | G01R 31/392 324/426 |
| 2015/0123468 A1* | 5/2015 | Wu | H02H 1/00 307/10.1 |
| 2015/0214766 A1* | 7/2015 | Shi | H02J 7/0054 320/103 |
| 2015/0256103 A1* | 9/2015 | Chiang | H02M 7/493 307/24 |
| 2015/0326000 A1* | 11/2015 | Kanzaki | H02H 7/1257 361/101 |
| 2015/0349519 A1* | 12/2015 | Li | H02H 9/02 361/86 |
| 2015/0357843 A1* | 12/2015 | Kobayashi | H02J 7/0016 320/118 |
| 2016/0020621 A1* | 1/2016 | Baby | H02J 7/0016 320/107 |
| 2016/0043578 A1* | 2/2016 | Miyamoto | H02J 7/0016 320/118 |
| 2016/0067512 A1* | 3/2016 | Norton | A61N 1/3975 607/5 |
| 2016/0178706 A1* | 6/2016 | Liu | G01R 31/367 702/63 |
| 2016/0181925 A1* | 6/2016 | Chiang | H02M 3/33584 363/17 |
| 2016/0190828 A1* | 6/2016 | Nakamura | H02J 7/0016 320/118 |
| 2016/0276854 A1* | 9/2016 | Lian | B60L 58/10 |
| 2016/0276855 A1* | 9/2016 | Lian | B60L 58/10 |
| 2016/0336767 A1* | 11/2016 | Zane | H02J 7/0021 |
| 2016/0372945 A1* | 12/2016 | Kageyama | H02J 7/0029 |
| 2017/0005487 A1* | 1/2017 | De Cock | H02J 7/0019 |
| 2017/0040792 A1* | 2/2017 | Li | H02H 9/02 |
| 2017/0054306 A1* | 2/2017 | Vo | H01M 10/4257 |
| 2017/0117591 A1* | 4/2017 | Ogg | H01M 10/4207 |
| 2017/0163160 A1* | 6/2017 | Din | H02J 7/0016 |
| 2017/0179723 A1* | 6/2017 | Chen | H02J 3/382 |
| 2017/0288422 A1* | 10/2017 | Yang | H01M 10/441 |
| 2017/0288431 A1* | 10/2017 | Lian | B60L 58/10 |
| 2017/0309968 A1* | 10/2017 | Komori | H01M 10/4285 |
| 2017/0353042 A1* | 12/2017 | Liu | H01M 10/4257 |
| 2017/0358930 A1* | 12/2017 | Rozman | H02J 5/00 |
| 2017/0373520 A1* | 12/2017 | Sugeno | H01M 10/44 |
| 2018/0062401 A1* | 3/2018 | Quiambao | H02J 7/0018 |
| 2018/0062402 A1* | 3/2018 | Syouda | H02J 7/0014 |
| 2018/0123357 A1* | 5/2018 | Beaston | H01M 10/482 |
| 2018/0152028 A1* | 5/2018 | Hsiao | H02J 7/0019 |
| 2018/0154794 A1* | 6/2018 | Hsiao | B60L 11/1866 |
| 2018/0366959 A1* | 12/2018 | Coenen | H02J 7/0019 |
| 2019/0036355 A1* | 1/2019 | Su | H02J 3/32 |
| 2019/0052119 A1* | 2/2019 | Hendrix | B60L 11/1855 |

* cited by examiner

BATTERY BALANCE MANAGEMENT CIRCUIT

FIELD OF THE INVENTION

The present disclosure relates to battery control technology, and in particular to a battery balance management circuit utilizing an external power supply circuit, effectively enabling the battery sets to provide stable large current output.

BACKGROUND OF THE INVENTION

Battery systems have been widely exploited in various electric vehicles, uninterrupted power systems, and related energy storage devices. The battery management system (BMS), which is the key component of the battery and products of different applications, is mainly employed to improve the utilization of the battery, to prevent the battery over-charging and over-discharging, to extend the battery life, and to monitor the battery status.

As the development of the battery management system progresses, the following functions can be implemented at present. (1) Accurate estimation of SOC: the state of charge (SOC) of the battery set, that is, the remaining battery capacity, can be accurately estimated, so as to ensure that the SOC is maintained within a reasonable range and to prevent damage to the battery due to over-charging or over-discharging. (2) Dynamic monitoring: in the process of battery charging and discharging, the terminal voltage, temperature, charging and discharging current and total battery voltage of each battery in the battery set are collected instantaneously so as to prevent battery over-charging or over-discharging. Meanwhile, it is able to promptly determine the battery in question so as to maintain the reliability and efficiency of the entire battery set. (3) Battery balance: it is to enable each battery in the battery set to reach a balanced state of charge. Balance technology is the key technology of a battery energy management system that is being researched and developed in the world at present.

In Taiwan patent No. 1527341, a battery management system, a current balancing method, and a circuit are disclosed. The battery management system includes: a battery set including a plurality of battery modules; and a plurality of control circuits corresponding to the plurality of battery modules. Each of the control circuits includes: a control unit that manages a corresponding plurality of battery modules and is operated by a corresponding consumption current; and a compensation unit, coupled to the control unit and configured to generate a corresponding compensation current such that the sum of the corresponding consumption current and the corresponding compensation current equals a target total current. The control circuits at least include a first control circuit and a second control circuit. The first control circuit includes a first control unit operated with a first consumption current. The second control circuit includes a second control unit operating with a second consumption current. The first control circuit generates a first compensation current based on the comparison of the first consumption current and the second consumption current. The second control circuit generates a second compensation current based on the comparison of the first consumption current and the second consumption current.

However, regarding practical application and mass production of a battery management system circuit, there are many problems that need to be overcome in the conventional art. Taking the aforementioned patent as an example, a battery management system and a power supply circuit are integrated and fabricated on a single circuit board. The amount of output current is limited to the current amount of the battery management system and a stable output of high current cannot be provided. Thus, the applicability of the product is reduced. The constant voltage charging method provides a constant voltage to charge the battery from the beginning to the end of charging. In the beginning of charging the battery, the charging voltage is greater than the battery voltage. The battery produces high current, so the sudden rise in temperature occurs in the battery. As the battery capacity increases, the battery voltage will be close to the voltage provided by the charger. At this situation, the charging time increases although the internal current of the battery is reduced.

SUMMARY OF THE INVENTION

An objective of the present disclosure is to provide a battery balance management circuit, utilizing an external balance management mechanism to compensate for current loss of the battery set, effectively enabling the battery sets to provide stable large current output. The functionality of recording charging and discharging balance progress is provided, facilitating the user to estimate the usage status of the battery and time to remove the battery.

To achieve at least the above objective, the disclosure provides a battery balance management circuit, comprising: a plurality of battery sets, an active and passive testing balance bus, a primary charging converter, a secondary charging system, an electrical load, and a battery management system. Each of the battery sets includes a battery, an upper switch coupled to a positive terminal of the battery, and a lower switch coupled to a negative terminal of the battery. The active and passive testing balance bus has a positive line and a negative line, wherein the upper switches of the battery sets are electrically coupled to the positive line, the lower switches of the battery sets are electrically coupled to the negative line. The primary charging converter has a first terminal and a second terminal, wherein the first terminal is electrically coupled to the positive line. The secondary charging system is electrically coupled to the positive line and the negative line and electrically coupled to the first terminal of the primary charging converter through the positive line. The electrical load is electrically coupled to the positive line and the negative line. The battery management system is for monitoring status of the battery sets, having a first current line electrically coupled to the second terminal of the primary charging converter and a second current line electrically coupled to an application node.

In an embodiment of the disclosure, the battery balance management circuit according to claim 1, wherein at least one switch controller is included between the secondary charging system and the positive line, the negative line.

In an embodiment of the disclosure, the secondary charging system is for monitoring and testing currents of the positive line and the negative line through the switch controller.

In an embodiment of the disclosure, when the secondary charging system tests the currents of the positive line and the negative line and thus detects that the currents of the positive line and the negative line are abnormal, the electrical load changes a load amount of the electrical load so as to balance the currents of the positive line and the negative line.

In an embodiment of the disclosure, when performing monitoring and thus detecting that at least one battery set of the battery sets is in abnormal status, the battery management system provides a first signal to the secondary charging system. When receiving the first signal, the secondary charging system disconnects the upper switch of the at least one battery set in abnormal status from the positive line of the active and passive testing balance bus, or disconnects the lower switch of the at least one battery set in abnormal status from the negative line of the active and passive testing balance bus.

In an embodiment of the disclosure, the battery management system provides a second signal to the electrical load when monitoring the status of the battery sets and thus detecting that at least one battery set of the battery sets is in abnormal status. When the electrical load receives the second signal from the battery management system, the electrical load provides a balance current through the active and passive testing balance bus so as to compensate for current loss caused by the at least one battery set in abnormal status.

In an embodiment of the disclosure, the secondary charging system, the electrical load and the battery management system are produced in different circuit boards.

In an embodiment of the disclosure, the battery is a secondary battery (e.g., battery that is recycled).

According to the disclosure, the battery management system of an external power supply circuit has the following advantages. (1) The battery management system can effectively enable the battery sets to provide stable large current output by way of additional power supply and balance paths. (2) The amount of the output current is not restricted to the current amount of the battery management system because the secondary charging system and the electrical load are independent of the battery management system; the battery management system can be utilized in energy storage products for different applications of electric current so as to enhance their product applicability.

DETAILED DESCRIPTION OF THE PREFERRED EMBODIMENTS

To make it easier for the examiner to understand the objects, characteristics and effects of this present disclosure, embodiments together with the attached drawings for the detailed description of the present disclosure are provided.

Figure 1:
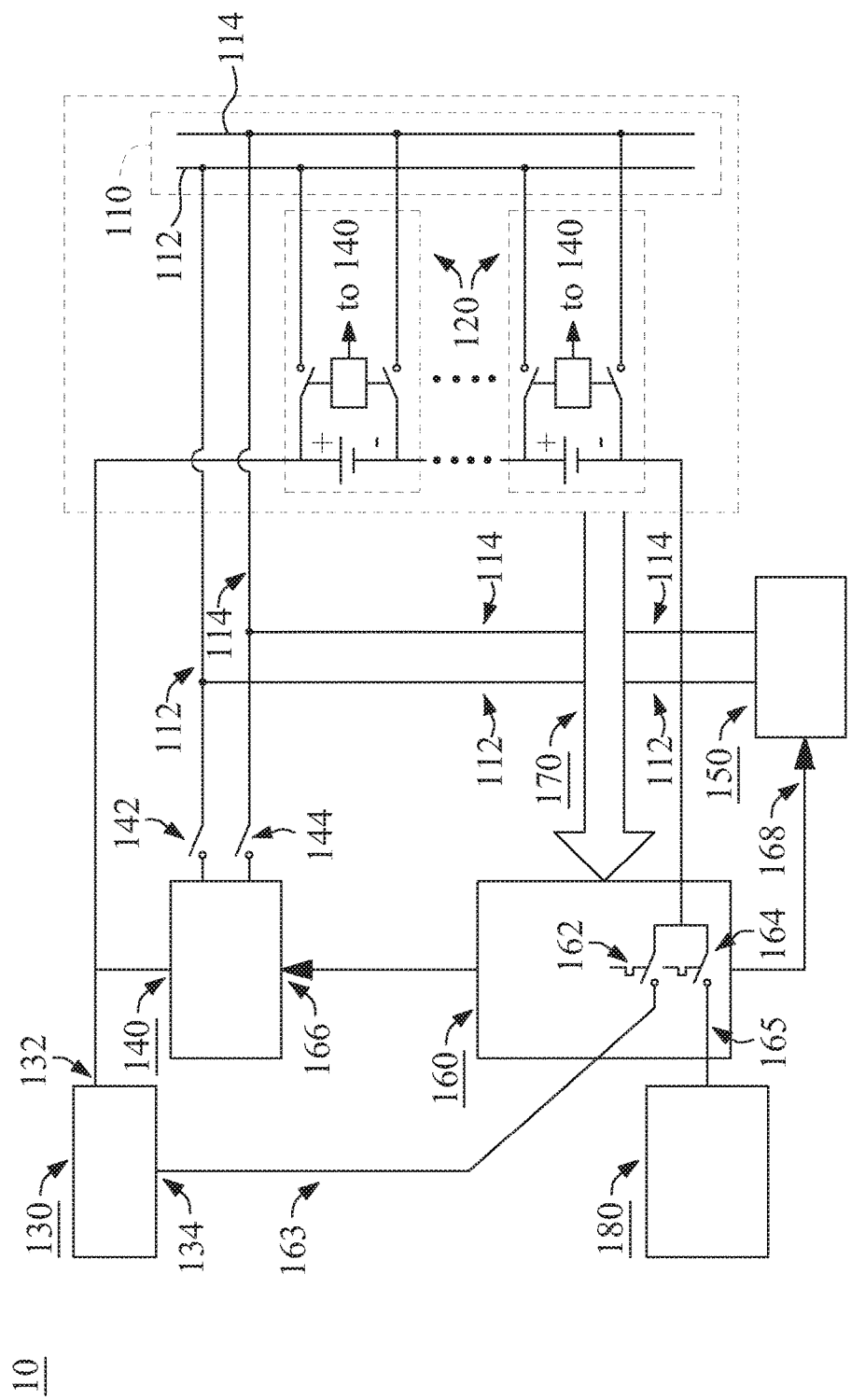
FIG. 1 is a functional block diagram illustrating of a battery balance management circuit according to the disclosure.
Figure 2:
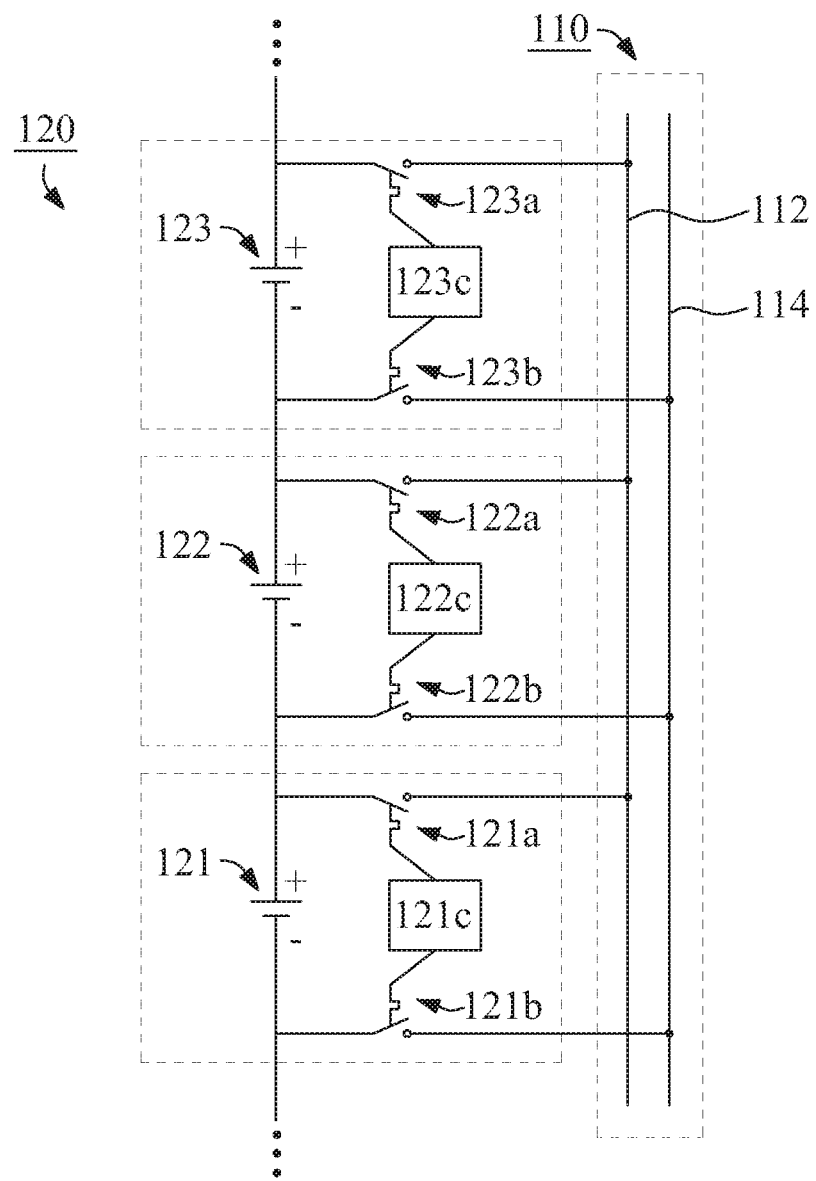
FIG. 2 is a schematic diagram illustrating a portion of the circuitry for battery sets of the battery balance management circuit according to the disclosure.

Referring to FIG. 1, a battery balance management circuit is illustrated in a functional block diagram according to the disclosure. Referring also to FIG. 2, a portion of the circuitry for battery sets of the battery balance management circuit is illustrated in a schematic diagram according to the disclosure.

An embodiment of the disclosure provides a battery balance management circuit 10, including: an active and passive testing balance bus 110; a plurality of battery sets 120; a primary charging converter 130; a secondary charging system 140; an electrical load 150; and a battery management system 160. In the embodiment of the disclosure, an external power supply circuit of the battery balance management circuit 100 includes the secondary charging system 140 and the electrical load 150.

The active and passive testing balance bus 110 has a positive line 112 and a negative line 114, which serve as primary paths for power balance and distribution of the battery balance management circuit according to the disclosure. The battery sets 120, which may include a plurality of battery sets, are illustrated in FIGS. 1 and 2 through three battery sets, and more battery sets can be included and connected, wherein the number of the battery sets is determined according to requirement for voltage and current in applications. Each of the battery sets includes a battery, a switch controller, an upper switch coupled to a positive terminal of the battery, and a lower switch coupled to a negative terminal of the battery. The upper switch of each battery set is electrically coupled to the positive line, and the lower switch of each battery set is electrically coupled to the negative line. For example, a battery set includes a battery 121, a switch controller 121c, an upper switch 121a coupled to a positive terminal of the battery 121, and a lower switch 121b coupled to a negative terminal of the battery 121. The upper switch 121a of each battery set is electrically coupled to the positive line 112, and the lower switch 121b of each battery set is electrically coupled to the negative line 114. The switch controller 121c is utilized for controlling the upper switch 121a and the lower switch 121b for connection or disconnection. The batteries 122 and 123 have the circuit configuration likewise.

In an example, the battery sets 120 can be mainly secondary batteries, referred to as electric vehicle batteries which are used and recycled. Although not meeting the requirement for safe electrical capacity for electric vehicles, the recycled batteries usually have energy density at high levels (e.g., about 80% of its original capacity) and can be recycled for other energy storage applications which require less battery capacity, thus improving the problem of disposition of the used electric vehicle batteries. However, the secondary batteries may still have some shortcomings, such as less stored energy, short battery life, and usage problem of serial or parallel connection, safety of utilization, difficulty in actual battery capacity estimation and so on. The secondary batteries have characteristic curves complicated than those of new batteries and vary in their properties significantly for different battery types. According to the disclosure, the battery balance management circuit mainly resolves the problems that arise from reuse of recycled secondary batteries. In particular, inconsistency among discharging currents of the battery sets will result in energy management difficulty and unstable output. Thus, an external balance power supply is provided according to the disclosure so as to compensate for discharging currents of the battery sets formed by secondary batteries, thus better fulfilling actual requirements for users.

The primary charging converter 130 has a first terminal 132 and a second terminal 134; and the first terminal 132 is electrically coupled to the positive line 112 of the active and passive testing balance bus 110.

The secondary charging system 140 is an active balance system, which includes a control unit and a memory unit (not shown). The secondary charging system 140 is electrically coupled to the positive line 112 and the negative line 114 of the active and passive testing balance bus 110. The secondary charging system 140 is electrically coupled to the first terminal 132 of the primary charging converter 130 through the positive line 112 of the active and passive testing balance bus 110. The secondary charging system 140 can actively monitor (independent of the battery management system) the current amount of the battery sets by way of the active and passive testing balance bus 110, and stores history of charging and discharging balance during usage by way of the memory unit so as to serve as a basis for users on which the battery life and status can be estimated.

The electrical load 150 is a passive balance system, which can be a power consumption component such as a high power resistor and so on. The electrical load 150 is electrically coupled to the positive line 112 and the negative line 114 of the active and passive testing balance bus 110.

The battery management system (BMS) 160 monitors status of the battery sets 120 by way of a monitoring circuit 170. The battery management system 160 has a first current line 163 and a second current line 165. The first current line 163 is electrically coupled to the second terminal 134 of the primary charging converter 130 through a first switch 162; and the second current line 165 is electrically coupled to an application node 180 through a second switch 164. The first switch 162 is controlled by the battery management system 160, which determines whether to turn on or off the first switch 162 for connection or disconnection of the first current line 163 so as to provide or not provide current to the primary charging converter 130. The second switch 164 is also controlled by the battery management system 160, which determines whether to turn on or off second switch 164 for connection or disconnection of the second current line 165 so as to provide current to the application node 180. The application node indicates a system, device, or grid to which the battery sets provide power. For example, an embodiment of the disclosure is employed in a driving system of an electric vehicle to perform balance management for driving batteries of the electric vehicle. Another embodiment of the disclosure is applied to an energy system including secondary batteries (e.g., used and recycled batteries), wherein the application node indicates the user device, power device, or energy storage grid, and so on.

For example, in addition to having functionality of the conventional battery management system, the battery management system 160 can generate a usage history file for the battery sets 120, so as to provide data for the refining and development of new battery set and primary charging converter and so on, or to provided data for off-line system failure analysis.

A positive line switch 142 is included between the secondary charging system 140 and the positive line 112 of the active and passive testing balance bus 110 and is electrically coupled to the positive line 112 of the active and passive testing balance bus 110. In addition, a negative line switch 144 is included between the secondary charging system 140 and the negative line 114 of the active and passive testing balance bus 110 and is electrically coupled to the positive line 114 of the active and passive testing balance bus 110.

In an embodiment, the secondary charging system 140 actively connects the positive line switch 142 and the negative line switch 144 so as to actively test the currents of the positive line 112 and the negative line 114 of the active and passive testing balance bus 110. In the process of battery charging and discharging, a current sensor with high precision and good stability is usually employed to carry out the test. Generally, a sensor is selected correspondingly according to the magnitude of the front-end current of the battery management system 160. The current sensor having characteristics such as resistance to low temperature, resistance to high temperature, resistance to strong shocks, high precision, and faster response time is required, for example.

When the secondary charging system 140 performs testing and thus detects that the currents of the positive line 112 and the negative line 114 of the active and passive testing balance bus 110 are abnormal, the electrical load 150 changes its load amount so as to balance the currents of the positive line 112 and the negative line 114 of the active and passive testing balance bus 110.

In another embodiment, when the battery management system 160 performs monitoring through the monitoring circuit 170 and thus detects that at least one battery set of the battery sets 120 is in abnormal status, for example, the battery set 121 in abnormal status 121, the battery management system 160 provides a first signal 166 to the secondary charging system 140. When the secondary charging system 140 receives the first signal 166 from the battery management system 160, the secondary charging system 140 informs the switch controller 121c of the battery set 121 to disconnect the upper switch 121a of the battery set 121 from the positive line 112 of the active and passive testing balance bus 110, or to disconnect the lower switch 121b of the battery set 121 from the negative line 114 of the active and passive testing balance bus 110.

Likewise, when the battery management system 160 performs monitoring through the monitoring circuit 170 and thus detects that at least one battery set of the battery sets 120 is in abnormal status, for example, the battery set 121 in abnormal status 121, the battery management system 160 provides a second signal 168 to the electrical load 150. As the electrical load 150 receives the second signal 168 from the battery management system 160, the electrical load 150 provides a balance current through the active and passive testing balance bus 110 so as to compensate for current loss caused by the at least one battery set 121 in abnormal status.

The external power supply circuit includes the secondary charging system 140 and the electrical load 150 and the battery management system 160, which are produced in different circuit boards, for example. The amount of the balance current is not limited to the current amount of the battery management system, and thus a stable large current output can be provided so that the battery management system can be exploited in a wide variety of energy storage systems and electric vehicle energy management technologies.

As disclosed above, the battery management system of the external power supply circuit according to the disclosure has the following advantages. (1) The battery management system can effectively enable the battery sets to provide stable large current output by way of an external power supply circuit. (2) The amount of current is not limited to the current amount of the conventional battery management system because the power supply circuit and the battery management system are produced in different circuit boards, for example; the battery management system can be utilized in energy storage products for different applications of electric current so as to enhance their product applicability. One of the embodiments according to the disclosure can be employed to detect and perform charging and discharging balance of secondary batteries which are recycled and reused; another embodiment can be utilized to detect battery health status and to manage, control the batteries according to stored history of charging and discharging balance, and inform the user of the time that the battery should be removed, so as to improve energy management efficiency and safety of electric vehicles.

While the present disclosure has been described by means of specific embodiments, numerous modifications and variations could be made thereto by those skilled in the art without departing from the scope and spirit of the present disclosure set forth in the claims.

What is claimed is:

1. A battery balance management circuit, comprising:
a plurality of battery sets, each of the battery sets including a battery, an upper switch coupled to a positive terminal of the battery, and a lower switch coupled to a negative terminal of the battery;
an active and passive testing balance bus, having a positive line and a negative line, wherein the upper switches of the battery sets are electrically coupled to the positive line, the lower switches of the battery sets are electrically coupled to the negative line;
a primary charging converter, having a first terminal and a second terminal, wherein the first terminal is electrically coupled to the positive line;
a secondary charging system, electrically coupled to the positive line and the negative line, and electrically coupled to the first terminal of the primary charging converter through the positive line;
an electrical load, electrically coupled to the positive line and the negative line; and
a battery management system for monitoring status of the battery sets, having a first current line electrically coupled to the second terminal of the primary charging converter and a second current line electrically coupled to an application node;
wherein at least one switch controller is included between the secondary charging system, and both the positive line and the negative line;
wherein the secondary charging system is for monitoring and testing currents of the positive line and the negative line, and when the secondary charging system performs testing and thus detects that the currents of the positive line and the negative line are abnormal, the electrical load changes a load amount of the electrical load so as to balance the currents of the positive line and the negative line.

2. The battery balance management circuit according to claim 1, wherein the secondary charging system, the electrical load and the battery management system are produced in different circuit boards.

3. The battery balance management circuit according to claim 1, wherein the battery is a secondary battery.

4. The battery balance management circuit according to claim 1, wherein when performing monitoring and thus detecting that at least one battery set of the battery sets is in abnormal status, the battery management system provides a first signal to the secondary charging system.

5. The battery balance management circuit according to claim 4, wherein when receiving the first signal, the secondary charging system informs the corresponding switch controller to disconnect the upper switch of the at least one battery set in abnormal status from the positive line of the active and passive testing balance bus, or the lower switch of the at least one battery set in abnormal status from the negative line of the active and passive testing balance bus.

6. The battery balance management circuit according to claim 1, wherein when monitoring the status of the battery sets and thus detecting that at least one battery set of the battery sets is in abnormal status, the battery management system provides a second signal to the electrical load.

7. The battery balance management circuit according to claim 6, wherein when the electrical load receives the second signal from the battery management system, the electrical load provides a balance current through the active and passive testing balance bus so as to compensate for current loss caused by the at least one battery set in abnormal status.

* * * * *